UNITED STATES PATENT OFFICE.

DANDRIDGE H. BIBB, OF NEW YORK, N. Y., ASSIGNOR TO CONTINENTAL PROCESS CORPORATION, OF BRIARCLIFF VILLAGE, NEW YORK, A CORPORATION OF NEW YORK.

PROCESS OF MAKING COHERING MASSES.

1,158,364.     Specification of Letters Patent.     Patented Oct. 26, 1915.

No Drawing. Application filed May 9, 1914, Serial No. 837,558. Renewed March 10, 1915. Serial No. 13,402.

*To all whom it may concern:*

Be it known that I, DANDRIDGE H. BIBB, a citizen of the United States, residing at New York city, county of New York, State of New York, have invented certain new and useful Improvements in Processes of Making Cohering Masses, of which the following is a full, clear, and exact description.

My invention relates to a new and improved process of making cohering masses, and has for its object to produce a durable mass consisting of granular material held together by a water resistant binder produced from the concentrated liquor being commonly known as waste sulfite liquor, the durable masses when so produced from materials such as ores or the like being suitable for use in a blast furnace.

It is a generally accepted proposition that masses or briquets in order to meet the conditions imposed upon them commercially, should have strength, abrasive resistance, and be substantially resistant to the action of water,—strength for handling during transportation, to resist disintegration while they are dropping through the blast furnace until such time as they reach the melting zone, abrasion resistance so as to resist abrasion during transportation, water resistant so as to withstand moisture while being transported or in storage.

It is a well known fact that the residue resulting from the evaporation of sulfite waste liquor is soluble, rendering it unfit without treatment for the purposes of a binder for briquets to meet the conditions imposed. Many attempts have been made to accomplish this result, some by the addition of foreign substances to the binder, and some by the agency of heat. So far these attempts have not proved commercially successful, the foreign substance after being used not rendering the masses or briquets insoluble, and the heat heretofore used coking the masses or briquets, thereby rendering them unsuitable to withstand abrasion and the coked part of the briquet disintegrating.

I have found in actual practice that there is a critical point when the sulfite liquor residue referred to is used as a binder and when heated to that critical point in a mass or briquet, and the heat sustained at that critical point for a given duration of time, the resultant product has the strength required, will resist abrasion and is water resistant.

The following is a description of my invention. In carrying out my invention I make use of waste liquor obtained in the sulfite process of paper making that has been evaporated so that it has a viscosity of about 30° to 32° Baumé. I also make use of granular material, which it is desired to make up in the form of masses, such as granular magnetite, hematite, titaniferous, copper or other ores, flue dust, pyrites cinder, etc.

In making a briquet by my process I take an amount of granular material and a sufficient amount of sulfite process waste liquor to bind the particles together. In practice I have found that in order to make a briquet of flue dust an amount of the waste sulfite liquor evaporated to a viscosity of 30° to 32° Baumé equal to from six (6) to eight (8) per cent. by weight of the flue dust, is sufficient. I thoroughly mix the flue dust with the sulfite liquor in any suitable mixing apparatus, and then press portions thereof one after another into the shape of briquets. I may press fifty portions, if desired, at one operation. These briquets are at this stage more or less fragile and are not water resistant. I have discovered that by subjecting them to the proper heat for the proper given duration of time, they become substantially water resistant, very strong and will resist abrasion. I subject them to heat at a temperature of about six hundred degrees (600°) Fahrenheit, for a period of about twenty (20) minutes. This results in converting the residue of the sulfite liquor into a non-coked water resistant substance and produces a completely formed and hardened water resistant briquet of flue dust bound together throughout by water resistant residue of sulfite process waste liquor, which briquet will stand a hard abrasion test.

In briqueting other granular material I proceed in a similar manner, varying the proportions of the binder from four (4) per cent. to ten (10) per cent. by weight according to the character of the granular substance, and the character of the resultant briquet desired, but subjecting it to substantially the same heat treatment.

As will be evident to those skilled in the art, my invention permits of modifications without departing from the spirit thereof or the scope of the appended claims.

What I claim is:

1. In the process of producing a cohering mass, the improvement which consists in mixing granular material with sulfite process waste liquor subjecting the mixture to pressure so as to form a cohering mass and converting the sulfite process waste liquor into a non-coked water resistant substance by the application of heat.

2. In the process of producing a cohering mass, the improvement which consists in mixing granular material with sulfite process waste liquor evaporated to a viscosity of about thirty degrees (30°) Baumé, subjecting the mixture to pressure so as to form a cohering mass and converting the sulfite process waste liquor into a non-coked water resistant substance by the application of heat.

3. In the process of producing a cohering mass, the improvement which consists in mixing granular material with sulfite process waste liquor subjecting the mixture to pressure so as to form a cohering mass and converting the sulfite process waste liquor into a non-coked water resistant substance by the application of heat about six hundred degrees (600°) Fahrenheit.

4. In the process of producing a cohering mass, the improvement which consists in mixing granular material with sulfite process waste liquor, subjecting the mixture to pressure so as to form a cohering mass and artificially heating the mass thus formed by a heat of about six hundred degrees (600°) Fahrenheit, and sustaining said heat for about twenty (20) minutes.

5. In the process of producing a cohering mass, the improvement which consists in mixing granular material with sulfite process waste liquor having a viscosity of about thirty degrees (30°) Baumé, subjecting the mixture to pressure so as to form a cohering mass and artificially heating the mass thus formed by a heat of about six hundred degrees (600°) Fahrenheit and sustaining said heat for a period of about twenty (20) minutes.

DANDRIDGE H. BIBB.

Witnesses:
H. B. BROWNELL,
HENDERSON F. HILL.